Figure 1:
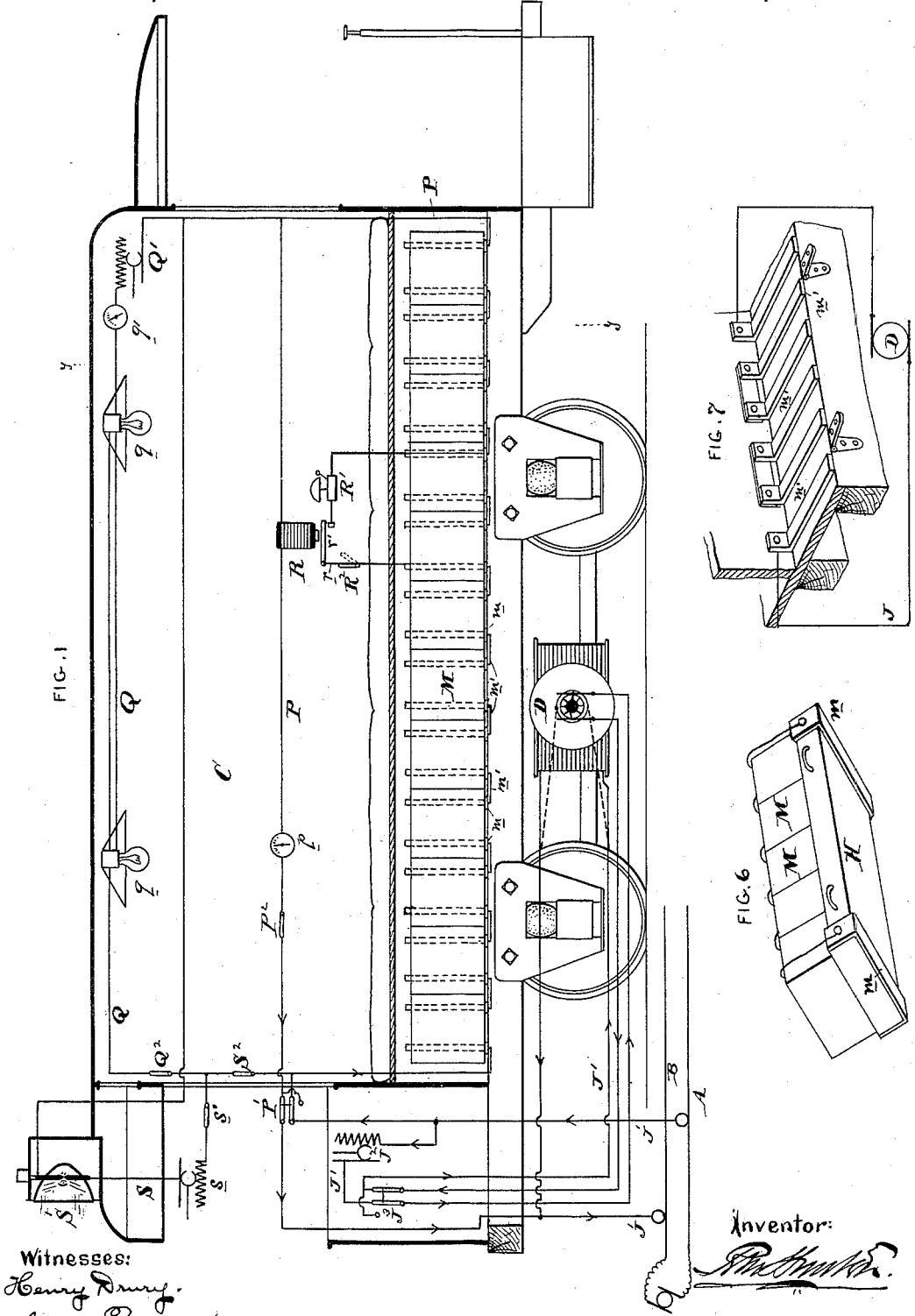

(No Model.) 2 Sheets—Sheet 2.
R. M. HUNTER.
ELECTRIC RAILWAY.
No. 392,675. Patented Nov. 13, 1888.
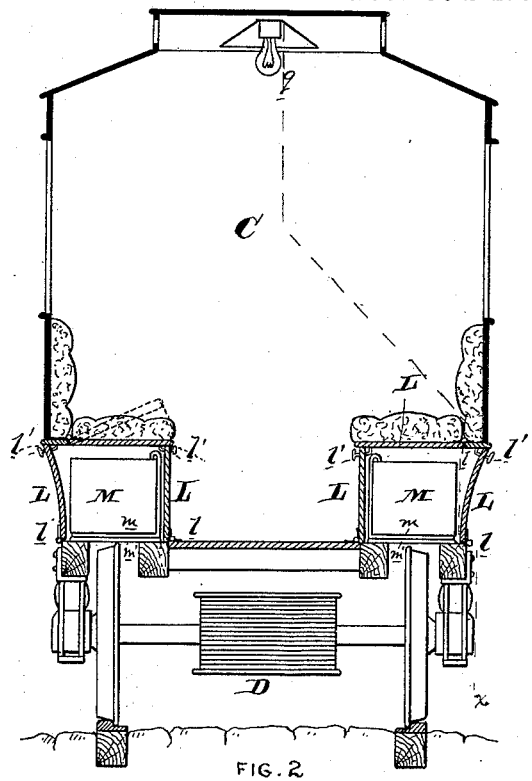
FIG. 2.
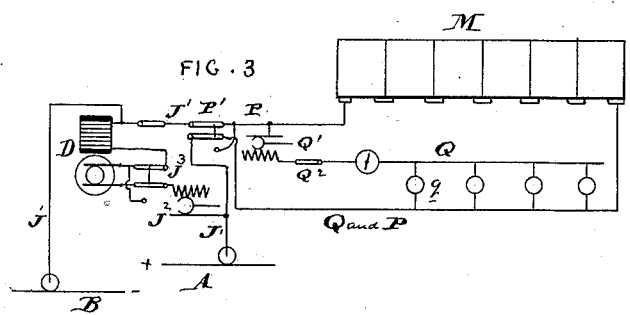
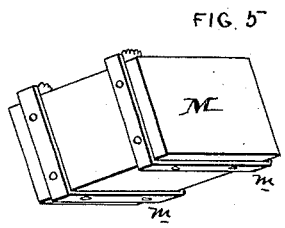
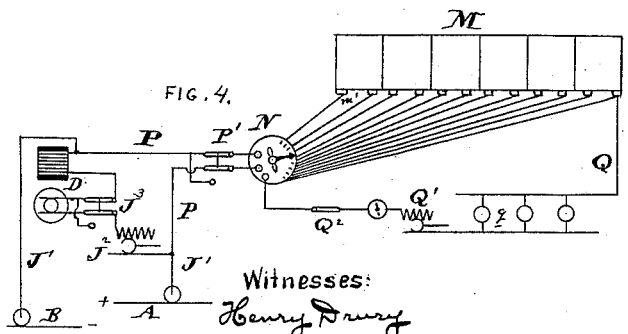
Witnesses:
Henry Drury
E. M. Buckined
Inventor:
R. M. Hunter

UNITED STATES PATENT OFFICE.

RUDOLPH M. HUNTER, OF PHILADELPHIA, PENNSYLVANIA.

ELECTRIC RAILWAY.

SPECIFICATION forming part of Letters Patent No. 392,675, dated November 13, 1888.

Original application filed November 30, 1886, Serial No. 220,240. Divided and this application filed July 12, 1888. Serial No. 279,731. (No model.)

*To all whom it may concern:*

Be it known that I, RUDOLPH M. HUNTER, of the city and county of Philadelphia, and State of Pennsylvania, have invented an Improvement in Electric Railways, of which the following is a specification.

My invention has reference to electric railways; and it consists of certain improvements fully set forth in the following specification and shown in the accompanying drawings, which form part thereof.

This application (Case 68) is a division of my application, Serial No. 220,240, filed November 30, 1886, and hence any matters herein set out but not claimed form subject-matter of that application.

The object of my invention is to provide means for supplying current to translating devices on electrically-propelled cars or vehicles by the employment of batteries, preferably of the character known as "secondary" batteries or "accumulators." The car is provided with an electric motor, electric lamps, and other translating devices, which are supplied with electricity from the line-current or from batteries on the car, or from both combined. Such batteries are preferably located under the seats of the car in the manner set out in my application filed September 23, 1886, Serial No. 214,309, and are inserted and removed through doors upon the outside or inside of the car-body. The supports for these batteries have contacts, upon which contacts on the battery-cells rest, and the electrical contact is insured by the weight of the cells themselves. By this means the act of inserting or removing the cells makes or breaks the electrical connection. These cells may be coupled up in any desired order to vary the strength of current, or they may be connected in series and other means of regulation employed, as set out in my patent, No. 385,180, June 26, 1888. The secondary batteries may be charged from the line or auxiliary conductors exterior to the car, and may be used to propel the car if the line-conductors become deranged or the generator at the central station becomes stopped from any cause, or if the car is to be run upon a portion of railways not supplied with conductors. It is also evident that it is immaterial how the batteries are charged, so far as their construction, operation, and location in the car are concerned. The motor and lighting circuit, with its lamps, are in shunt relation with respect to the batteries, and each has independent controlling mechanism. I also provide the battery-circuit with alarm devices to indicate automatically the completion of charging of the batteries, and which may be charged from the line-conductors or from a suitable source of electric supply at the central station or car-house and while the batteries are on the car or removed therefrom.

In place of putting the battery-cells separately into the compartment on the car they may be supported on a removable floor or tray, and the contacts from the cells may be coupled up and terminate in positive and negative contacts on the removable floor or tray adapted to make connection with the contacts on the car, the weight of the cells and tray insuring a good contact.

In the drawings, Figure 1 is a side sectional elevation of an electric car embodying my improvements, taken on line $x\ x$ of Fig. 2. Fig. 2 is a cross-section of same on line $y\ y$. Fig. 3 is a diagram of the circuits on the car shown in Fig. 1. Fig. 4 is a diagram showing a modification of same. Fig. 5 is a perspective view of one of the battery-cells. Fig. 6 is a perspective view of the supporting-tray or removable floor, which may be used to hold a number of batteries, with batteries shown thereon; and Fig. 7 is a general perspective view showing the connection of the contacts on the car for coupling up the batteries.

C is the car, which may be of any desired construction.

D is the electric motor, carried in any convenient manner upon the car and suitably connected with the axle thereof.

A and B are two lines of working-conductors, which are made in sections. The conductors may be either the rails or auxiliary conductors, suspended exposed on the surface of the road-bed or placed in a slotted conduit.

M represents a series of cells of a secondary battery. These cells are located under the seats of the car, as shown in Fig. 2, and may be inserted and removed through side doors, which may be upon the outside of the car, as set out in my patent, No. 384,911, June 19, 1888, or upon the inside, as indicated in this application, in which L represents the doors, hinged at $l$ and provided with locks or catches $l'$. In this case the outside walls of the compartments under the seats are also provided with doors L. Either or both of these doors may be used in changing or inspecting the battery-cells, which would be often if charged at a central station. These doors need not necessarily be hinged, though it is preferable that they should be. The inner doors may be the seat-cushion support, if so desired. Arranged in these compartments are metallic contact-plates $m'$, which may be in fixed connection with a controlling-switch, N, Fig. 4, for coupling them up in different ways to vary the power of the batteries, or they may be coupled in series, as shown in Fig. 3. The cells M are also provided with contact strips or plates $m$, which rest upon plates $m'$ when the cells are in position, and the weight of the cells themselves insures good electrical contact. The act of removing the cells breaks the circuit, and inserting the cells couples them up into operative condition. It is immaterial how these strips or plates are made or arranged.

If desired, the batteries M may be supported upon a board or tray, H, having contact strips or terminals $m$, (see Fig. 6,) and the cells on such tray are coupled together and to the terminals. These trays are inserted into the compartment on the car and make automatic connection with the strips $m'$. It is evident that while secondary batteries are preferable, broadly considered, the means of supporting and coupling up of the batteries applies equally well to primary batteries. These batteries are connected by circuits P with the motor-circuit J', and said motor-circuit is provided with a current-reverser, $J^3$, and current-indicator $p$. From this it will be observed that the batteries may be charged from the motor-circuit or may be used to supply current to the motor when desired or when necessity requires. The secondary batteries may be utilized to supply current to electric lamps $q$ to light the car, said lamps being in multiple or parallel connection in circuit Q, which may be provided with a current-indicator, $q'$, and resistance-changer $Q'$. It may also be used for supplying current to the head-light S', which has its own circuit S, resistance-changer $s$, and circuit-breaker $s'$. A switch, $S^2$, may be used to extinguish all of the lights, switch $s'$ the head-light alone, and switch $Q^2$ the interior lights alone.

To indicate when the secondary batteries are fully charged, I provide a signal-circuit, $r$, including one or more cells of the secondary battery, (but only a small portion of the whole,) and locate in said circuit a key, $R^2$, to break the circuit permanently, a switch, $r'$, to close the circuit temporarily, and an alarm, R'. The switch $r'$ is operated by an electro-magnet, R, in the charging-circuit P. So long as the charging-current is of a given strength stronger than the secondary or reverse current of the battery the magnet R will hold the switch $r'$ open; but once the secondary battery is sufficiently charged the power of the magnet is weakened and the switch drops, sounding an alarm. The switch $P^2$ is then opened.

In charging the batteries the line-current from A B passes through the circuit P and acts to charge them. When charged the switch P' may be shifted to send the current back in either direction into the motor-circuit. This switch P' might be dispensed with and an ordinary circuit-reversing switch used alone. The switch $J^3$ enables the motor to be reversed with the line on battery-current. The regulator $J^2$ may be of any form desired, and the regulating means generally are located on the operator's platform or within reach therefrom. The switch $P^2$ may be used to cut the battery out of circuit.

I have described the general features of my improvements; but it is to be understood that I do not limit myself to the details, as they may be modified in various ways without departing from my invention.

In this application I do not claim the placing of the batteries within compartments with doors opening upon the inside of the car separately or in conjunction with similar doors upon the outside of the car, as that forms subject-matter of division of this application, Serial No. 286,848, of 1888.

Having now described my invention, what I claim as new, and desire to secure by Letters Patent, is—

1. The combination of a car-body having contacts and removable batteries, also having corresponding contacts, with exposed contact-surfaces adapted to rest upon the contacts in the car-body and bring the weight of the batteries largely upon said contacts to insure good electrical connection.

2. The combination of a car-body having contacts and removable batteries supported thereby, also having contacts supported by seats which rest upon the contacts in the car-body, and in which the battery is supported upon the contacts of the car-body through its own contacts.

3. The combination of the car-body having compartments under the seats made with removable covers or doors, and which compartments are provided with a series of contacts, and a series of removable secondary batteries, also having corresponding contacts which rest upon the contacts in the compartments, and which, by the weight of the batteries when placed in position upon the car, make electrical contact with the contacts on the car-body to couple said batteries in operative connection.

4. In an electric railway, a working-conductor arranged along the track, a traveling vehicle, a secondary battery formed of a large number of cells carried by said vehicle, an electrical connection between said conductor and battery to charge the latter, a signal-circuit including one or more cells, but of considerably less number than the whole, an alarm in said signal-circuit, a circuit breaker and maker, and a controlling-magnet in the charging-circuit.

5. In an electric railway, a working-conductor arranged along the track, a traveling vehicle, a secondary battery formed of a large number of cells carried by said vehicle, an electrical connection between said conductor and battery to charge the latter, a signal-circuit including one or more cells, but of considerably less number than the whole, an alarm in said signal-circuit, a circuit breaker and maker, a controlling-magnet in the charging-circuit, an electric motor, and an electric connection between the motor and battery.

6. In an electric railway, a working-conductor arranged along the track, a traveling vehicle, a secondary battery formed of a large number of cells carried by said vehicle, an electrical connection between said conductor and battery to charge the latter, a signal-circuit including one or more cells, but of considerably less number than the whole, an alarm in said signal-circuit, a circuit breaker and maker, a controlling-magnet in the charging-circuit, and a switch to break the charging-circuit.

7. In an electric railway, a working-conductor arranged along the track, a traveling vehicle, a secondary battery formed of a large number of cells carried by said vehicle, an electrical connection between said conductor and battery to charge the latter, a signal-circuit including one or more cells, but of considerably less number than the whole, an alarm in said signal-circuit, a circuit breaker and maker, a controlling-magnet in the charging-circuit, and switches to break the charging and signaling circuits.

8. The combination, with a car having contact-pieces permanently fixed thereon, of a removable battery having corresponding terminal contacts arranged to rest upon the contacts on the car, whereby the weight of the battery insures good electrical contact, a circuit on the car connecting with said fixed contacts, and a translating device in said circuit.

9. A car-body having fixed contacts, two circuits having their terminals connected electrically with said contacts, and thus connected in parallel with respect to each other, a translating device in each of said circuits, independent means to control the current flowing over said circuits, and a removable battery having contacts corresponding with the fixed contacts on the car, and which, when the battery is placed in position on the car, make electrical contact with the fixed contacts by being held against them by the weight of the battery.

10. A car-body having fixed contacts, two circuits having their terminals connected electrically with said contacts, and thus connected in parallel with respect to each other, an electric motor to propel the car in one of said circuits and an electric lamp in the other of said circuits, independent means to control the current flowing over said circuits, and a removable battery having contacts corresponding with the fixed contacts on the car, and which, when the battery is placed in position on the car, make electrical contact with the fixed contacts by being held against them by the weight of the battery.

11. The combination of a car-body, a compartment thereon having one or more removable doors thereto, contacts contained within said compartment in electrical connection with translating devices on the car, and a removable battery consisting of one or more cells and having contacts corresponding to those upon the car, and which contacts support the battery, the weight of which holds the contacts together within the compartment to couple the battery in circuit with the translating devices on the car.

12. The combination of a railway, a line-conductor extending along said railway, an electrically-propelled vehicle, a secondary battery carried by the vehicle, but removable therefrom, contacts on the vehicle and battery for automatically coupling them in operative circuit, and electric circuits connecting the line-conductor, the motor, and battery-contacts on the car, whereby the battery is in circuit with motor and line-conductor and may be removed without interfering with the connection of the said motor and line-conductor.

13. The combination of a railway, a line-conductor extending along said railway, an electrically-propelled vehicle, a secondary battery carried by the vehicle, but removable therefrom, contacts on the vehicle and battery for automatically coupling them in operative circuit, and electric circuits on the car for coupling the motor and battery in multiple connection, and in which the batteries may be removed from the car without interfering with the connection between the line-conductor and motor.

14. The combination of a car, an electric head-light, interior electric lamps, separate circuits for said head-light and lamps in multiple connection with each other, separate switches to cut out either said head-light or lamps, permanent contacts on the car connecting with the terminals of said circuits, and a removable battery having corresponding contacts and adapted to be automatically coupled up into circuit upon placing the battery in position on the car.

15. The combination of a car, an electric head-light, interior electric lamps, separate circuits for said head-light and lamps in multiple connection with each other, separate switches to cut out either said head-light or lamps, a regulator to control the current flowing over the respective circuits, permanent contacts on the car connecting with the terminals of said circuits, and a removable battery having corresponding contacts and adapted to be automatically coupled up into circuit upon placing the battery in position on the car.

16. The combination of a car, an electric motor on the car, a secondary battery on the car, contacts on the car and battery for automatically coupling them into circuit upon placing the battery in position on the car, permanent circuits on the car connecting the motor and contacts for the battery, a reversing-switch for reversing the motor, and a separate reversing-switch to reverse the terminals of the battery to the motor-circuit.

17. The combination of a series of secondary battery-cells, a charging-circuit, an alarm circuit including one or more of said cells, but a small portion of the whole number of cells, an alarm in said circuit, a loose circuit-closer which normally closes said alarm-circuit when unacted on, and an electro-magnet in the charging-circuit, and adapted to attract and hold said circuit-closer open during charging of said cells and allow it to automatically close upon weakening of the strength of the electro-magnet by the increase of the reverse current of the battery.

18. The combination of a series of secondary battery-cells, a charging-circuit, an alarm-circuit including one or more of said cells, but a small portion of the whole number of cells, an alarm in said circuit, a loose circuit-closer which normally closes said alarm-circuit when unacted on, an electro-magnet in the charging-circuit, and adapted to attract and hold said circuit-closer open during charging of said cells and allow it to automatically close upon weakening of the strength of the electro-magnet by the increase of the reverse current of the battery, and a hand-switch to break said alarm-circuit to prevent the action of the alarm.

19. The combination of a series of secondary battery-cells, a charging-circuit, an electro-magnet in said charging-circuit, a signal-circuit, an automatic circuit-closer for said signal-circuit, a signal in said signal-circuit, an electro-magnet in the charging-circuit to actuate said circuit-closer to hold it open while charging the battery, an electric motor, a circuit including the battery and motor, a reversing-switch to reverse the current in the motor, and a circuit-breaking switch to cut the battery-current out from the motor.

In testimony of which invention I hereunto set my hand.

RUDOLPH M. HUNTER.

Witnesses:
ERNEST HOWARD HUNTER,
E. M. BRECKINREED.